United States Patent
Bhargava et al.

(10) Patent No.: US 11,475,628 B2
(45) Date of Patent: Oct. 18, 2022

(54) MONOCULAR 3D VEHICLE MODELING AND AUTO-LABELING USING SEMANTIC KEYPOINTS

(71) Applicant: TOYOTA RESEARCH INSTITUTE, INC., Los Altos, CA (US)

(72) Inventors: Arjun Bhargava, San Francisco, CA (US); Sudeep Pillai, Santa Clara, CA (US); Kuan-Hui Lee, San Jose, CA (US); Kun-Hsin Chen, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/147,049

(22) Filed: Jan. 12, 2021

(65) Prior Publication Data
US 2022/0222889 A1    Jul. 14, 2022

(51) Int. Cl.
*G06T 17/00*    (2006.01)
*G06T 19/20*    (2011.01)
(Continued)

(52) U.S. Cl.
CPC ............... *G06T 17/00* (2013.01); *G06N 3/04* (2013.01); *G06T 7/251* (2017.01); *G06T 7/344* (2017.01); *G06T 7/50* (2017.01); *G06T 19/20* (2013.01); *G06V 20/64* (2022.01); *G06T 2207/10016* (2013.01); *G06T 2207/20081* (2013.01); *G06T 2207/20084* (2013.01); *G06T 2207/30236* (2013.01); *G06T 2207/30241* (2013.01);
(Continued)

(58) Field of Classification Search
None
See application file for complete search history.

(56) References Cited

U.S. PATENT DOCUMENTS 9,002,055 B2    4/2015    Funayama et al.
10,733,506 B1    8/2020    Ogale et al.
(Continued)

OTHER PUBLICATIONS

Song, et al., "ApolloCar3D: A Large 3D Car Instance Understanding Benchmark for Autonomous Driving", arXiv:1811.12222v2, Nov. 29, 2018.

(Continued)

*Primary Examiner* — Jeffrey J Chow
(74) *Attorney, Agent, or Firm* — Seyfarth Shaw LLP

(57) ABSTRACT

A method for 3D object modeling includes linking 2D semantic keypoints of an object within a video stream into a 2D structured object geometry. The method includes inputting, to a neural network, the object to generate a 2D NOCS image and a shape vector, the shape vector being mapped to a continuously traversable coordinate shape. The method includes applying a differentiable shape renderer to the SDF shape and the 2D NOCS image to render a shape of the object corresponding to a 3D object model in the continuously traversable coordinate shape space. The method includes lifting the linked, 2D semantic keypoints of the 2D structured object geometry to a 3D structured object geometry. The method includes geometrically and projectively aligning the 3D object model, the 3D structured object geometry, and the rendered shape to form a rendered object. The method includes generating 3D bounding boxes from the rendered object.

20 Claims, 8 Drawing Sheets

(51) Int. Cl.
 *G06T 7/246* (2017.01)
 *G06T 7/33* (2017.01)
 *G06N 3/04* (2006.01)
 *G06T 7/50* (2017.01)
 *G06V 20/64* (2022.01)

(52) U.S. Cl.
 CPC .............. *G06T 2207/30252* (2013.01); *G06T 2210/12* (2013.01); *G06T 2219/004* (2013.01); *G06T 2219/2004* (2013.01); *G06V 2201/08* (2022.01)

(56) References Cited

U.S. PATENT DOCUMENTS

| | | |
|---|---|---|
| 2020/0134379 A1 | 4/2020 | Gaidon et al. |
| 2020/0226786 A1 | 7/2020 | Fitzgibbon et al. |
| 2020/0278217 A1 | 9/2020 | Ahmad et al. |
| 2021/0150722 A1* | 5/2021 | Homayounfar ...... G06K 9/6267 |
| 2021/0209797 A1* | 7/2021 | Lee ........................... G06T 7/75 |

OTHER PUBLICATIONS

Liu, et al., "SMOKE: Single-Stage Monocular 3D Object Detection via Keypoint Estimation," arXiv:2002.10111v1, Feb. 24, 2020.

Tang, et al., "Neural Outlier Rejection for Self-Supervised Keypoint Learning", arXiv:1912.10615v1, Dec. 23, 2019.

Zakharov, et al., "Autolabeling 3D objects with Differentiable Rendering of SDF Shape Priors," arXiv:1911.11288v2, Apr. 2, 2020.

* cited by examiner

MONOCULAR 3D VEHICLE MODELING AND AUTO-LABELING USING SEMANTIC KEYPOINTS

BACKGROUND

Field

Certain aspects of the present disclosure generally relate to machine learning and, more particularly, monocular 3D vehicle modeling and auto-labeling using semantic keypoints.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of an autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a video input based on annotations of automobiles within the scene. Unfortunately, annotating video is a challenging task involving deep understanding of visual scenes. A network architecture to perform semantic keypoint auto-labeling is desired.

SUMMARY

A method for 3D object modeling includes linking 2D semantic keypoints of an object within a video stream into a 2D structured object geometry. The method includes inputting, to a neural network, the object to generate a 2D NOCS image and a shape vector, the shape vector being mapped to a continuously traversable coordinate shape. The method includes applying a differentiable shape renderer to the SDF shape and the 2D NOCS image to render a shape of the object corresponding to a 3D object model in the continuously traversable coordinate shape space. The method includes lifting the linked, 2D semantic keypoints of the 2D structured object geometry to a 3D structured object geometry. The method includes geometrically and projectively aligning the 3D object model, the 3D structured object geometry, and the rendered shape to form a rendered object. The method includes generating 3D bounding boxes from the rendered object.

A non-transitory computer-readable medium having program code recorded thereon for monocular 3D object modeling and auto-labeling with 2D semantic keypoints is described. The program code is executed by a processor. The non-transitory computer-readable medium includes program code to link the 2D semantic keypoints of an object within an image of a video stream into a 2D structured object geometry. The non-transitory computer-readable medium includes program code to concurrently input, to a neural network, the object to generate a 2D normalized object coordinate space (NOCS) image and a shape vector. The shape vector is mapped to a continuously traversable coordinate shape space that combines a signed-distance-field (SDF) shape with the 2D NOCS image. The non-transitory computer-readable medium includes program code to apply a differentiable shape renderer to the SDF shape and the 2D NOCS image to render a shape of the object corresponding to a 3D object model in the continuously traversable coordinate shape space. The non-transitory computer-readable medium includes program code to lift the linked, 2D semantic keypoints of the 2D structured object geometry to a 3D structured object geometry. The non-transitory computer-readable medium includes program code to geometrically and projectively align the 3D object model, the 3D structured object geometry, and the rendered shape to form a rendered object. The non-transitory computer-readable medium includes program code to generate 3D bounding boxes from the rendered object.

A system for monocular 3D object modeling and auto-labeling with 2D semantic keypoints is described. The system includes a semantic keypoint detection module to link the 2D semantic keypoints of an object within an image of a video stream into a 2D structured object geometry. The system includes a 3D object module trained to generate a 2D normalized object coordinate space (NOCS) image and a shape vector. The shape vector is mapped to a continuously traversable coordinate shape space that combines a signed-distance-field (SDF) shape with the 2D NOCS image and to apply a differentiable shape renderer to the SDF shape and the 2D NOCS image to render a shape of an object corresponding to the 3D object model in the continuously traversable coordinate shape space. The system includes a 3D keypoint lifting module to lift the linked, 2D semantic keypoints of the 2D structured object geometry to a 3D structured object geometry. The system includes a 3D auto-labeling module to geometrically and projectively align the 3D object model, the 3D structured object geometry, and the rendered shape to form a rendered object and to generating 3D bounding boxes from the rendered object.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed

DETAILED DESCRIPTION

Figure 1:
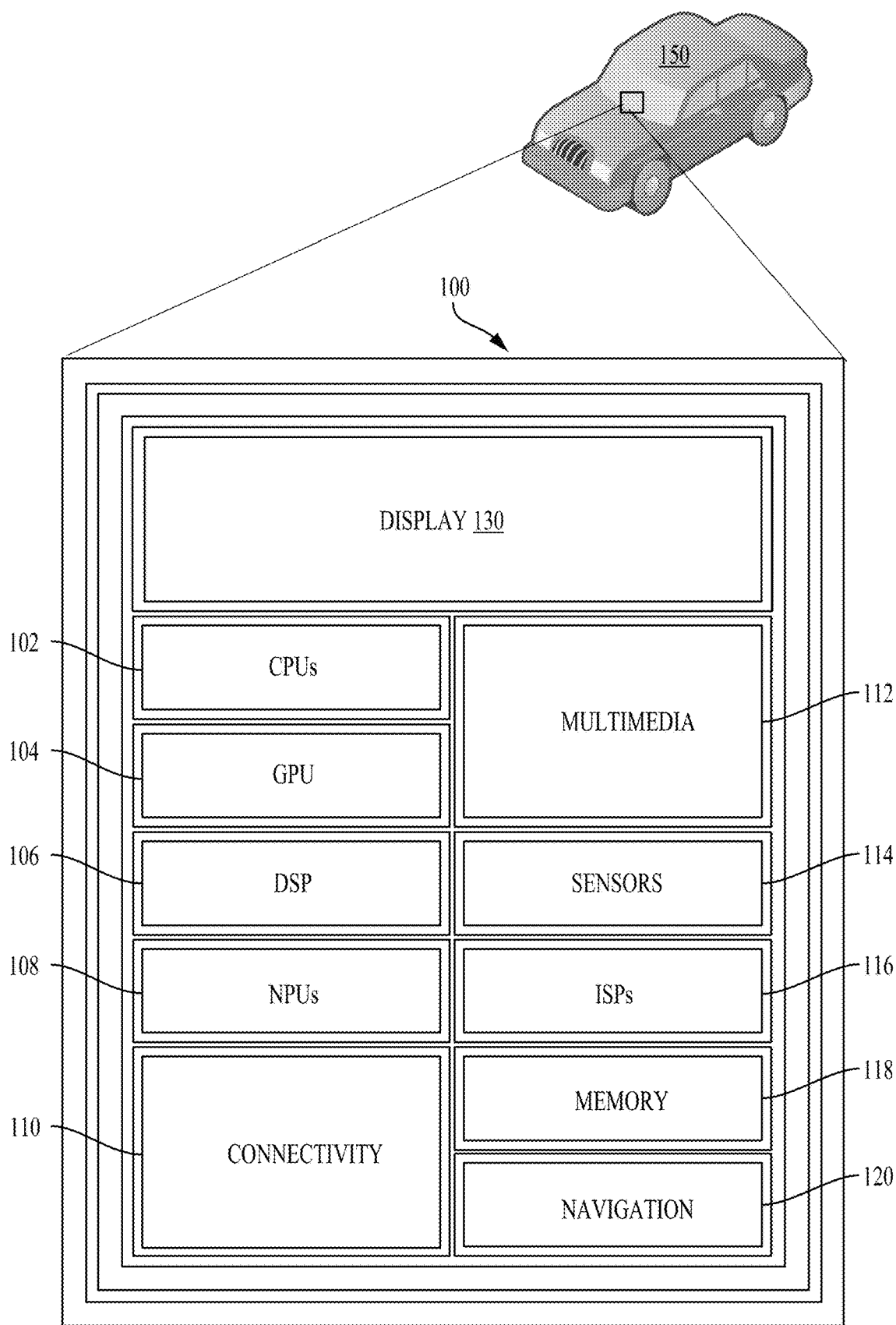
FIG. 1 illustrates an example implementation of designing a system using a system-on-a-chip (SOC) for 3D auto-labeling using 2D semantic keypoints, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Deep learning often involves large labeled datasets to reach state-of-the-art performance. In the context of three-dimensional (3D) object detection for autonomous vehicles and other robotics applications, 3D cuboids are an example of one annotation type. 3D cuboids are used because they allow for proper reasoning over all nine degrees of freedom. For example, the nine degrees of freedom may include three degrees of freedom for each instance of location, orientation, and metric extent). Unfortunately, acquiring enough labels to train 3D object detectors can be laborious and costly, as it mostly relies on a large number of human annotators. Conventional approaches to scaling up annotation pipelines include better tooling, active learning, or a combination thereof. These approaches, however, often rely on heuristics and involve humans in the loop to correct the semi-automatic labeling, especially for difficult edge cases.

In particular, conventional methods in the domain of deep learning are strongly reliant on supervised training regimes. While they can provide for immediate learning of mappings from input to output, supervision involves large amounts of annotated datasets to accomplish the task. Unfortunately, acquiring these annotated datasets is laborious and costly. Additionally, the cost of annotating varies greatly with the annotation type because 2D bounding boxes are much cheaper and faster to annotate than, for example, instance segmentations or cuboids.

Furthermore, tracking of interest points within frames of a monocular video stream is an important perception tasks in the area of autonomous agents, such as autonomous operation of an ego vehicle. Detecting interest points in RGB images and matching them across views is a fundamental capability of many robotic systems. Keypoints may represent interest points that are more low-level points and may not have clear semantic meaning, such as a corner point or ending point of a line segment. As described, semantic keypoints are points of interest with semantic meaning for objects in an image. For example, the right back taillight of a car, the left back taillight of the car, the front left tire hub of the car, and other like features of the car. According to aspects of the present disclosure, linked semantic keypoints provide a structured vehicle geometry for facilitating a 3D modeling process.

Aspects of the present disclosure provide an improvement over the conventional annotation methods by using semantic keypoints for auto-labeling objects (e.g., vehicles and non-vehicles). These semantic keypoints provide a structured vehicle geometry for facilitating a 3D modeling process. This aspect of the present disclosure effectively uses 2D semantic keypoints for 3D auto-labeling of vehicle. For example, automatic 3D labeling of vehicles in a scene is performed based on 2D semantic keypoint detection and tracking. That is, semantic keypoints provide a structured vehicle geometry for facilitating a 3D modeling process.

One configuration of the monocular 3D vehicle modeling and auto-labeling system includes a continuously traversable coordinate shape-space (CSS) that combines a signed-distance-field (SDF) shape-space with normalized object coordinates (NOCS). This combination makes it possible to set object shapes into correspondence, which facilitates deformable shape matching. The monocular 3D vehicle modeling and auto-labeling system employ a differentiable SDF renderer for comparative scene analysis over a defined shape-space. In addition, the 3D annotation and object-detection system includes a learning curriculum for an auto-labeling pipeline that may begin with synthetic data (e.g., computer-aided design (CAD) models of vehicles and driving scenes, in an autonomous-driving context). In one configuration, the auto-labeling pipeline mixes synthetic and real data in subsequent training loops, and progressively increases the difficulty level of the input data throughout the training loops.

In some aspects, 3D vehicle modeling is applied to auto-labeling applications for saving manpower and reducing costs. Conventional techniques leverage 3D sensors to assist with 3D modeling, while some techniques lift 2D to 3D for constructing the models. Aspects of the present disclosure leverage 2D semantic keypoints which correspond to a well-structured 3D geometry for facilitating building of a 3D object model, state estimation, and tracking. In one aspect, a monocular 3D vehicle modeling and auto-labeling systems includes the following stages. A first stage may perform automatic labeling of video frames using a pre-trained 2D semantic keypoint detector. In a second stage, an implicit shape space is learned using a parametrized and generative model, such as a conditional variational auto-encoder (cVAE). A third stage applies a differentiable shape renderer to signed distance fields (SDF), leveraged together with normalized object coordinate spaces (NOCS) to solve the inverse rendering problem. A fourth stage geometrically and projectively aligns these shapes to lifted keypoints. A fifth stage generates 3D bounding boxes from rendered vehicles.

FIG. 1 illustrates an example implementation of the aforementioned system and method for monocular 3D vehicle modeling and auto-labeling using a system-on-a-chip (SOC) 100 of an ego vehicle 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for 3D auto-labeling with structural and physical constraints of objects (e.g., vehicle and non-vehicle objects) within an image captured by the sensor processor 114. The instructions loaded into a processor (e.g., CPU 102) may also include code for planning and control (e.g., of the ego vehicle) in response to linking the 3D objects over time, creating smooth trajectories while respecting the road and physical boundaries from images captured by the sensor processor 114.

The instructions loaded into a processor (e.g., CPU 102) may also include code to identify initial object-seeds for all frames from a given frame sequence of a scene. The instructions loaded into a processor (e.g., CPU 102) may also include code to refine each of the initial object-seeds over the 2D/3D data, while complying with predetermined structural and physical constraints to auto-label 3D object vehicles within the scene. The instructions loaded into a processor (e.g., CPU 102) may further include code to link the auto-label 3D object vehicles over time into trajectories while respecting the predetermined structural and physical constraints.

Figure 2:
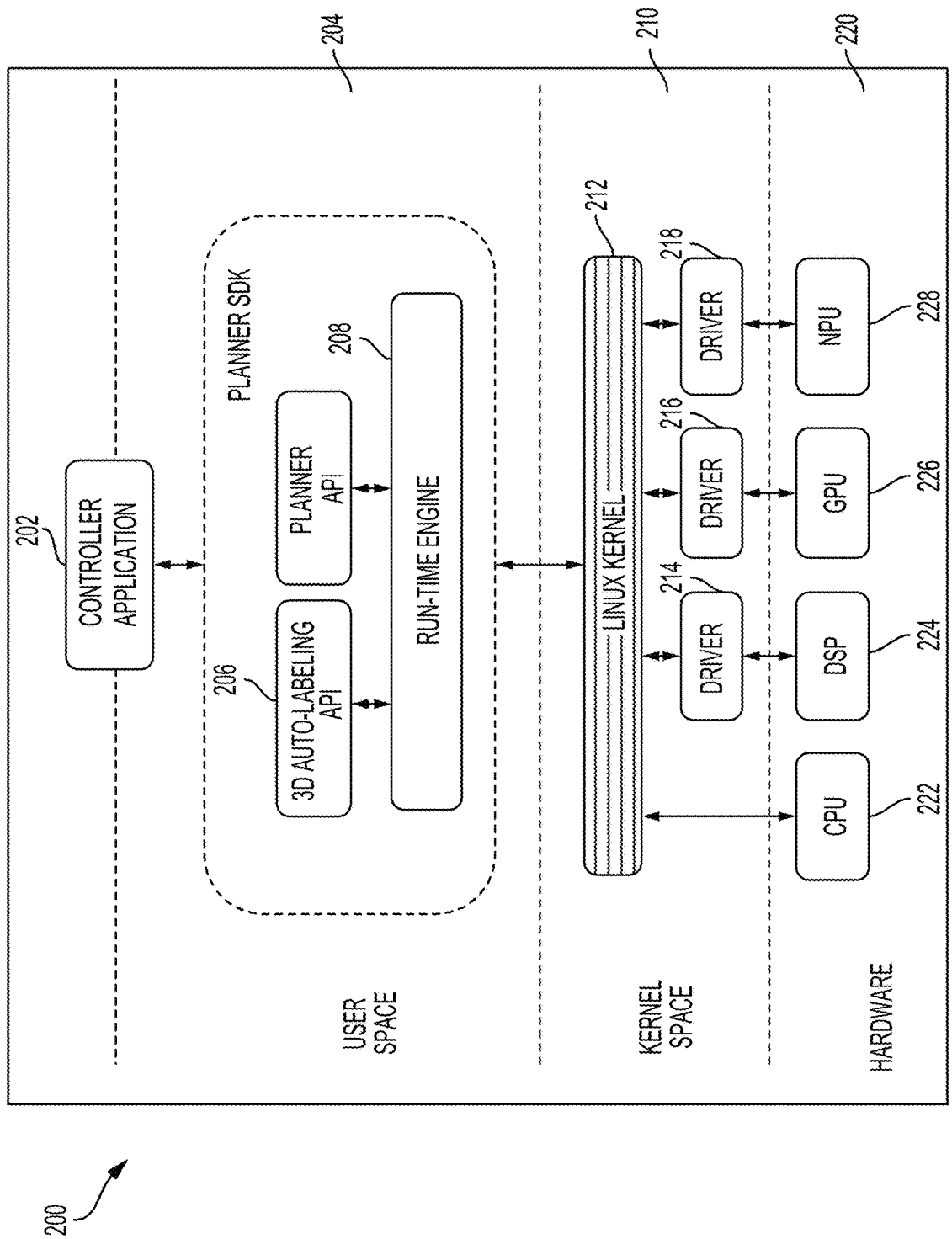
FIG. 2 is a block diagram illustrating a software architecture that may modularize functions for 3D auto-labeling using 2D semantic keypoints, according to aspects of the present disclosure.

FIG. 2 is a block diagram illustrating a software architecture 200 that may modularize functions for planning and control of an ego vehicle using a 3D auto-labeling system with semantic keypoints, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, analyze a scene in a video captured by a monocular camera of an ego vehicle based on 3D auto-labeling of objects in the scene. In aspects of the present disclosure, monocular 3D vehicle modeling and auto-labeling of the video is improved by using semantic keypoints. One aspect of the present disclosure provides an improved monocular three-dimensional (3D) vehicle modeling and auto-labeling system using semantic keypoints. The controller application 202 may make a request to compile program code associated with a library defined in a 3D auto-labeling application programming interface (API) 206 to label vehicles within a scene of a video captured by the monocular camera of the ego vehicle using 2D semantic keypoint detection and tracking.

A run-time engine 208, which may be compiled code of a run-time framework, may be further accessible to the controller application 202. The controller application 202 may cause the run-time engine 208, for example, to perform monocular (single-camera) 3D detection and auto-labeling. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
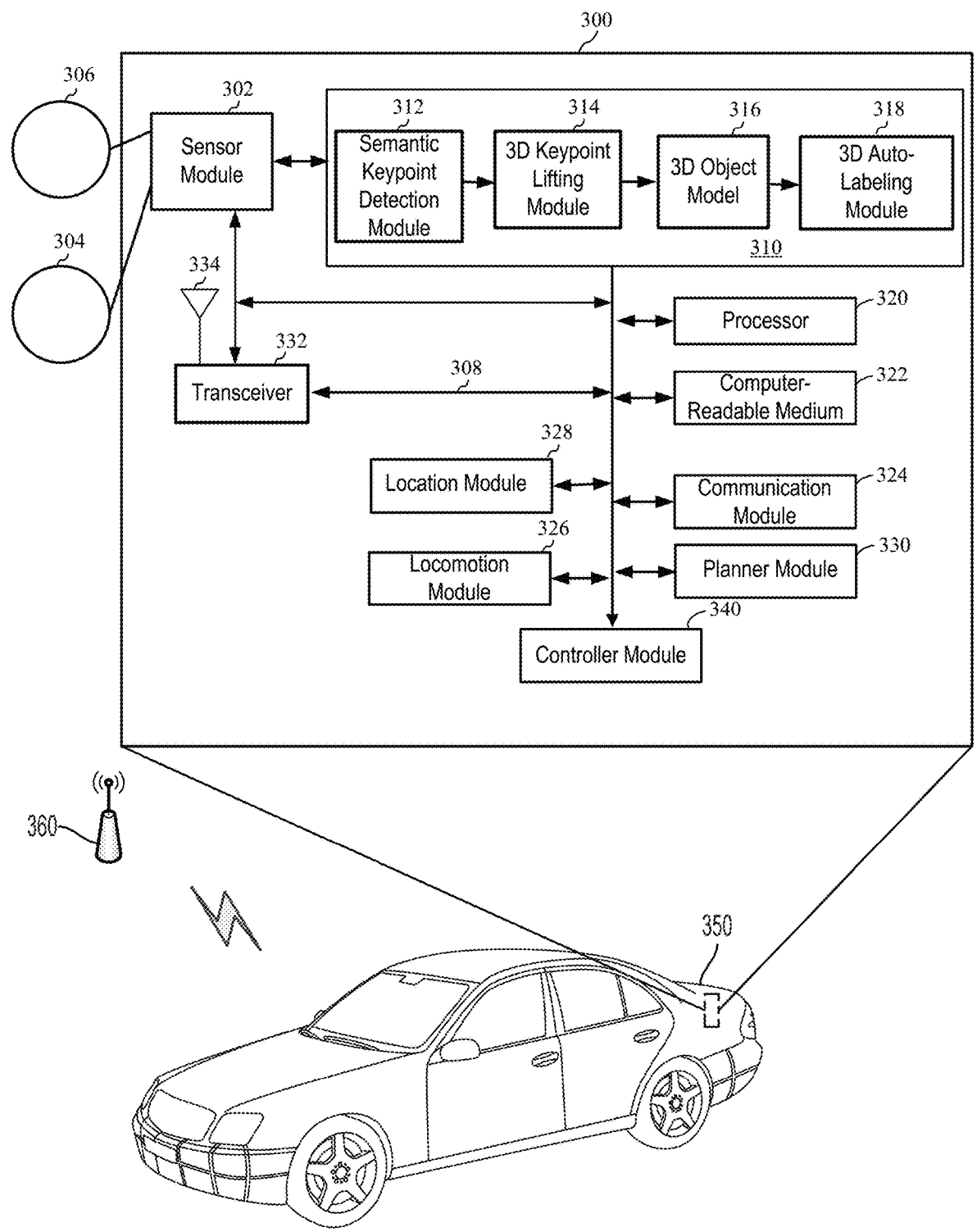
FIG. 3 is a diagram illustrating an example of a hardware implementation for a 3D auto-labeling system using 2D semantic keypoints, according to aspects of the present disclosure.

FIG. 3 is a diagram illustrating an example of a hardware implementation for a 3D auto-labeling system 300 using semantic keypoints, according to aspects of the present disclosure. The 3D auto-labeling system 300 may be configured for understanding a scene to enable planning and controlling an ego vehicle in response to images from video captured through a camera during operation of a car 350. The 3D auto-labeling system 300 may be a component of a vehicle, a robotic device, or other device. For example, as shown in FIG. 3, the 3D auto-labeling system 300 is a component of the car 350. Aspects of the present disclosure are not limited to the 3D auto-labeling system 300 being a component of the car 350, as other devices, such as a bus, motorcycle, or other like vehicle, are also contemplated for using the 3D auto-labeling system 300. The car 350 may be autonomous or semi-autonomous. Although described with reference to the car 350, it should be recognized that the 3D auto-labeling system 300 may be implemented using an offline process, in which the car 350 is limited to data collection.

The 3D auto-labeling system 300 may be implemented with an interconnected architecture, represented generally by an interconnect 308. The interconnect 308 may include any number of point-to-point interconnects, buses, and/or bridges depending on the specific application of the 3D auto-labeling system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The 3D auto-labeling system 300 includes a transceiver 332 coupled to the sensor module 302, the vehicle perception module 310, the processor 320, the computer-readable medium 322, the communication module 324, the locomotion module 326, the location module 328, a planner module 330, and a controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit auto-labeled 3D objects within a video and/or planned actions from the vehicle perception module 310 to a server (not shown).

The 3D auto-labeling system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the 3D auto-labeling system 300 to perform the various functions described for ego vehicle perception of auto-labeled scenes within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the 3D auto-labeling system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The 3D auto-labeling system 300 also includes the planner module 330 for planning a selected trajectory to perform a route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the locomotion module 326, the location module 328, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306 to perform 3D auto-labeling of vehicle and non-vehicle objects from images captured by the first sensor 304 or the second sensor 306 of the car 350.

As shown in FIG. 3, the vehicle perception module 310 includes a semantic keypoint detection module 312, a 3D keypoint lifting module 314, a 3D object model 316, and a 3D auto-labeling module 318. The semantic keypoint detection module 312, the 3D keypoint lifting module 314, the 3D object model 316, and the 3D auto-labeling module 318 may be components of a same or different artificial neural network, such as a deep neural network (DNN). The 3D object model 316 is not limited to a deep neural network. In operation, the vehicle perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

Understanding a scene from a video input based on auto-labeling of 3D objects within a scene is an important perception task in the area of autonomous driving, such as the car 350. The present disclosure expands the use of shape priors to perform auto-labeling using semantic keypoints. As described, a "shape prior" is information known about the shape of objects in advance. For example, the shape prior information may recognize that vehicles should have a rigid shape. As described, semantic keypoints are points of interest with semantic meaning for objects in an image. For example, the right back taillight of a car, the left back taillight of the car, the front left tire hub of the car, and other like features of the car.

As described, keypoints may represent interest points that are more low-level points that may not have clear semantic meaning, such as a corner point or ending point of a line segment. The keypoints may be detected using a keypoint heat map. As described, a keypoint heatmap identifies broad regions of an image where a keypoint is likely found based on a final prediction. In some aspects, a keypoint graph neural network (KGNN) is configured to link keypoints in a 2D graph structure representing an object category of an object in a frame of a video stream such as a vehicle.

The vehicle perception module 310 is configured to understand a scene from a video input (e.g., the sensor module) based on 3D auto-labels describing objects (e.g., vehicles) within the scene as a perception task during autonomous driving of the car 350. Aspects of the present disclosure are directed to a method for auto-labeling 3D objects including identifying, by the semantic keypoint detection module 312, semantic keypoints for frames from a given frame sequence of a scene. Although described with reference to the car 350, it should be recognized that the 3D auto-labeling system 300 may be implemented using an offline process, in which the car 350 is limited to data collection.

For example, the semantic keypoints components of objects that may be vehicles, but are also non-vehicle objects. Once identified, the 3D keypoint lifting module 314 performs a lifting procedure to lift detected 2D semantic keypoints into a 3D structured vehicle geometric. A 3D object model 316 is geometrically and projectively aligned with the 3D structured vehicle geometry to provide a rendered vehicle. The 3D auto-labeling module generated 3D bounding boxes from the rendered vehicle to provide 3D auto-labeling of the rendered vehicle.

Overview of 3D Auto-Labeling Pipeline

Figure 4:
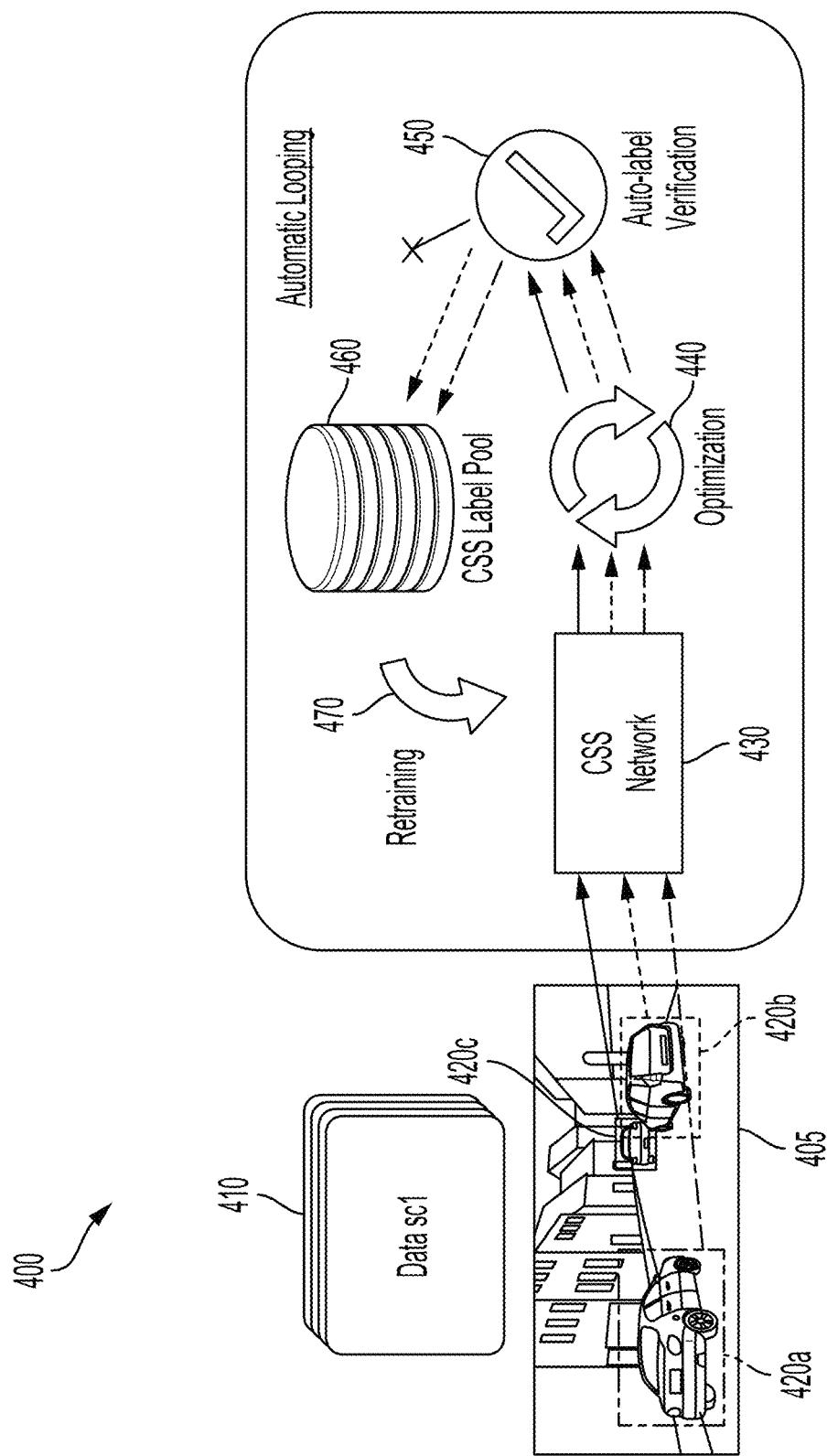
FIG. 4 is a block diagram of a 3D auto-labeling pipeline for the 3D auto-labeling system of FIG. 3, according to aspects of the present disclosure.
Figure 5:
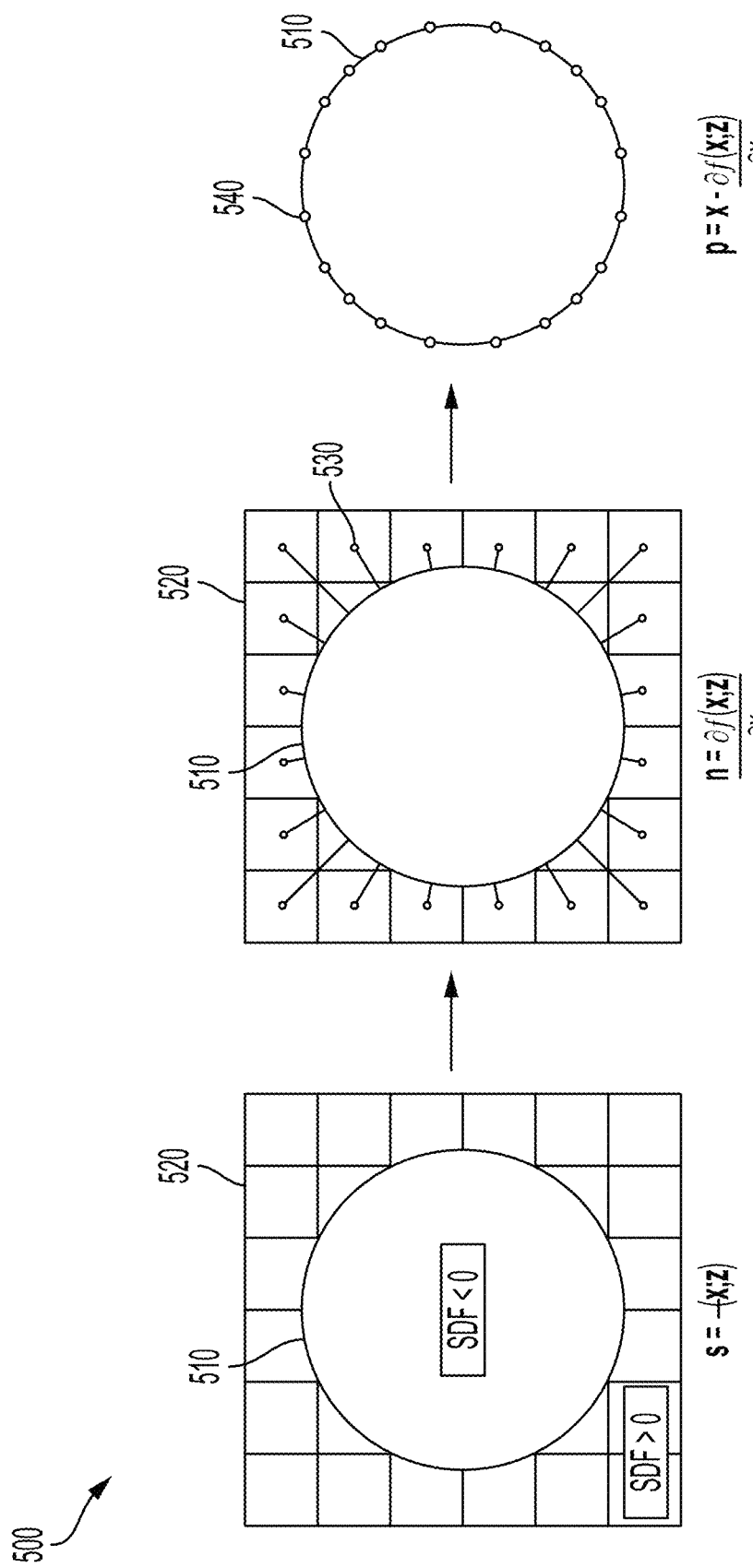
FIGS. 5A-5C illustrate surface projection of an object using signed-distance-fields (SDFs), according to aspects of the present disclosure.

FIG. 4 is a block diagram of a 3D auto-labeling pipeline 400 for the 3D auto-labeling system 300, in accordance with an illustrative configuration of the present disclosure. In FIG. 4, a dataset 410 potentially includes both real image and synthetic input data. As described, the synthetic input data can include computer-rendered driving scenes and CAD models of different types of vehicles with ground-truth annotations. In these configurations, the synthetic input data is used for training a coordinate shape-space (CSS) network 430, such as a conditional variational encoder (cVAE). In the example of FIG. 4, a 2D object detector (e.g., the vehicle perception module 310 of FIG. 3) has detected three vehicles in an input image 405 and has labeled them, respectively, with a 2D label 420a, a 2D label 420b, and a 2D label 420c. In this example, the 2D labels are 2D bounding boxes. The vehicle perception module 310 inputs the 2D label 420a, the 2D label 420b, and the 2D label 420c to the CSS network 430.

In this aspect of the present disclosure, for each 2D-labeled object, the vehicle perception module 310 produces a 2D normalized object coordinates (NOCS) image and a shape vector. The vehicle perception module 310 decodes the 2D NOCS image and the shape vector to a 3D object model in the CSS network 430 (e.g., continuously traversable CSS network). The vehicle perception module 310 then geometrically-and-projective aligns the 2D NOCS image to a corresponding 3D structure vehicle geometry of the object.

In this aspect of the present disclosure, the 3D object model 316 performs an optimization process 440, which involves iteratively refining the geometric and projective alignment using a differentiable signed-distance-field (SDF) renderer. The 3D auto-labeling module 318 can then perform an auto-label verification process 450 to discard obviously incorrect auto-labels before harvesting them into the CSS label pool 460. Once all of the frames have been processed in a particular training loop, the CSS network 430 can be retrained (retraining 470 in FIG. 4), and the next training loop over the dataset 410 can begin. Various aspects of the 3D auto-labeling pipeline 400 are discussed in further detail in connection with FIGS. 5A-7 below.

Coordinate Shape-Space (CSS)

These configurations employ a coordinate-space framework to embed vehicle models into a joint, compact shape-space representation with a single neural network (e.g., the CSS network 430). The concept is to transform input models into SDFs where each value signifies the distance to the closest surface, with positive and negative values representing exterior and interior regions, respectively. The SDF representation is desirable because it is generally easy for a neural network to learn. Eventually, a shape-space of implicit surfaces is formed with a decoder that can be queried at spatially-continuous 3D locations $x=\{x_1, \ldots, x_N\}$ with a provided latent code z (the shape vector discussed above) to retrieve SDF values $s=\{s_1, \ldots, s_N\}$; $f(x; z)=s$.

To facilitate approximate deformable shape matching, these configurations combine the shape-space with NOCS to form a continuously traversable CSS, as discussed above. To that end, these configurations resize the models to unit diameter and interpret 3D coordinates of the 0-level set as dense surface descriptions.

To train the function $f$, these configurations use synthetic input data, including multiple CAD models of vehicles, as well as rendered traffic scenes with accompanying ground-truth labels. These configurations follow the original Deep-SDF approach to training, but the latent vectors (e.g., shape vectors) are projected onto the unit sphere after each iteration (e.g., after each pass through the training loop). In the CSS, each vehicle corresponds to a single shape vector. For example, (0,1,1) might be an SUV, (0,1,0) might be a convertible, and (0,0,1) might be a Porsche®. The vectors are continuous, meaning that the CSS is continuously traversed from one vehicle to another (as if one vehicle "morphs" into another as the shape-space is traversed). In these configurations, the CSS is three dimensional, but in other configurations it is possible to have a shape-space of a different dimensionality.

Differentiable SDF Rendering

One component of the 3D auto-labeling pipeline 400 is the ability to optimize objects regarding pose, scale, and shape. These functions are performed by the 3D object model 316, as discussed above. To that end, these configurations include a differentiable SDF renderer. This differentiable SDF renderer avoids mesh-related problems, such as connectivity or intersections, and includes a different way of sampling the representation. These configurations also employ an alternative formulation for rendering implicit surfaces that lends itself to back-propagation.

One aspect of the differentiable SDF renderer is the projection of a 0-isosurface. Provided with query points $x_i$ and associated signed-distance values $s_i$, these configurations include a differentiable way to access the implicit surface. Simply selecting query points based on their signed-distance values does not form a derivative with respect to the latent vector. Moreover, the regularly sampled locations are approximately on the surface. These configurations exploit the property that deriving the SDF with respect to its location yields the normal at this point, practically computed with a backward pass:

$$n_i = \frac{\partial f(x_i; z)}{\partial x_i}.$$

Because normals provide the direction to the closest surface and signed-distance values provide the exact distance. In this example, the query location can be projected onto a 3D surface position $p_i$:

$$p_i = x_i - \frac{\partial f(x_i; z)}{\partial x_i} f(x_i; z)$$

To get clean surface projections, these configurations disregard all points $x_i$ outside a narrow band ($\|s_i\|>0.03$) of the surface. A schematic explanation is provided in FIGS. 5A-5C.

FIGS. 5A-5C illustrate the surface projection 500 of an object using SDFs, in accordance with an illustrative configuration of the present disclosure. FIG. 5A illustrates an object surface 510 within a query grid 520. As indicated in FIG. 5A, locations interior to object surface 510 have negative SDF values, and those exterior to object surface 510 have positive SDF values. FIG. 5B illustrates the normals for points 530 exterior to object surface 510. FIG. 5C illustrates the projected object-surface points 540 that lie on object surface 510.

Another aspect of the differentiable SDF renderer is the use of surface tangent disks. In the field of computer graphics, the concept of surface elements (surfels) is a well-established alternative to connected triangular primitives. The differentiable SDF representation in these configurations yields oriented points and can be immediately used to render surface disks. To obtain a watertight surface, disk diameters are selected that are large enough to close holes. The surface discs can be constructed as follows:

1. Given the normal of a projected point $$n_i = \frac{\partial f(p_i; z)}{\partial p_i},$$

estimate the 3D coordinates of the resulting tangent plane visible in the screen. The distance d of the plane to each 2D pixel (u, v) can be computed by solving a system of linear equations for the plane and camera projection, resulting in the following solution:

$$d = \frac{n_i \cdot p_i}{n_i \cdot K^{-1} \cdot (u, v, 1)^T},$$

where $K^{-1}$ is the inverse camera matrix, followed by back-projection to get the final 3D plane coordinate: $P=K^{-1} \cdot (u \cdot d, v \cdot d, d)^T$.

2. Estimate the distance between the plane vertex and surface point and clamp, if it is larger than the disc diameter: $M=\max(\text{diam}-\|p_i-P\|_2, 0)$. To ensure water-tightness, the diameter from the query location density is computed: $\text{diam}=\min_{i \neq j}\|x_i-x_j\|_2\sqrt{3}$. Performing the foregoing calculations for each pixel yields a depth map $D_i$ and a tangential distance mask $M_i$ at point $p_i$.

3D Auto-Labeling Pipeline

Another aspect of the differentiable SDF renderer is the rendering function. To generate a final rendering, these configurations employ a function that composes layers of 2D-projected disks onto an image plane. This can include combining colors from different point primitives based on their depth values. The closer the primitive is to the camera, the stronger its contribution. These configurations use softmax to ensure that all primitive contributions sum up to 1 at each pixel. More specifically, the rendering function is $\mathscr{I} = \Sigma_i \text{NOCS}(p_i)^* w_i$, where $\mathscr{I}$ is the resulting image, NOCS returns coordinate coloring, and the $w_i$ are the weighting masks that define the contribution of each disk:

$$w_i = \frac{\exp(-\tilde{D}_i \sigma) M_i}{\sum_j \exp(-\tilde{D}_j \sigma) M_j},$$

where $\tilde{D}$ is the normalized depth, and $\sigma$ is a transparency constant with $\sigma \to \infty$ being completely opaque as only the closest primitive is rendered. The foregoing formulation enables gradient flow from pixels to surface points and allows image-based optimization. The foregoing optimization functions following the initialization phase can be carried out by the 3D object model 316.

3D Object Detection

One underlying principle of the auto-labeling approach in these configurations is to exploit semantic keypoints to recover labels of higher complexity. While this idea has wide applicability, these configurations focus specifically on cuboid auto-labeling of driving scenes. As discussed above in connection with FIGS. 3 and 4, the 3D auto-labeling module 318 can run multiple loops (iterations) of the 3D auto-labeling pipeline 400 during a training phase. In the first training loop, the CSS label pool 460 includes entirely synthetic labels, and the CSS network 430 (e.g., trained CSS network) is not yet well adapted to real imagery. The results can be noisy NOCS predictions that are reliable only for well-behaved object instances in the scene.

In one aspect of the present disclosure, the vehicle perception module 310 directs a predetermined training curriculum in which the CSS network 430 is first exposed to easy annotations, and the vehicle perception module 310 increases the difficulty over subsequent training loops. In these configurations, the difficulty of an annotation can be defined by measuring the pixel sizes of the 2D label, the amount of intersection with other 2D labels, and whether the 2D label touches the border of the image (often indicating object truncation). The vehicle perception module 310 includes thresholds for these criteria to define a curriculum of increasing difficulty.

For example, the CSS network 430 is derived from a ResNet18 backbone and follows an encoder-decoder structure, processing 128×128 input patches to output a NOCS map of the same size and a 3D shape vector. Additional details regarding the structure of the CSS network 430 are provided below in connection with the discussion of FIG. 6. Before the first annotation loop, the vehicle perception module 310 trains the CSS Network 430 to infer 2D NOCS maps and shape vectors from patches. As mentioned above, such a mapping can be bootstrapped from the synthetic input data.

Figure 6:
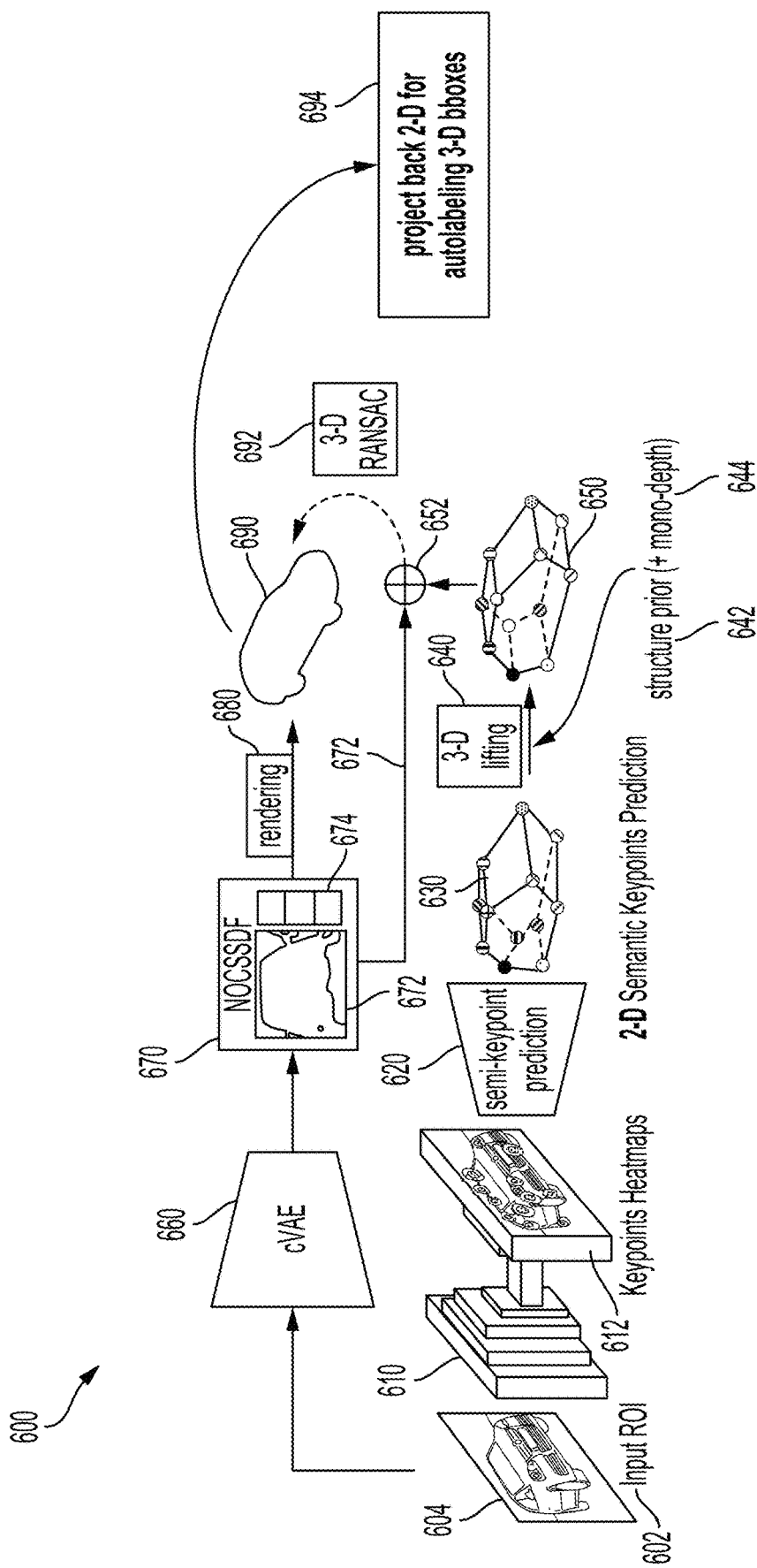
FIG. 6 is a diagram of the initialization portion of a 3D auto-labeling pipeline for the 3D auto-labeling system of FIG. 3, according to aspects of the present disclosure.

FIG. 6 is a diagram of the initialization portion of a 3D auto-labeling pipeline 600 for the 3D auto-labeling system 300 of FIG. 3, in accordance with an illustrative configuration of the present disclosure. In one configuration, the 3D auto-labeling pipeline 600 is composed of an image backbone 610 that receives an input region of interest (ROI) 602, including an object 604, such as a vehicle. For example, the image backbone 610 receives the input ROI 602 of a monocular video stream. In this example, the image backbone 610 extracts relevant appearance and geometric features of the object 604. In aspects of the present disclosure, the image backbone 610 generate a keypoint heatmap 612 of the object 604 to enable semantic keypoint extraction. The keypoint heatmap 612 is provided to a semantic keypoint predictor 620.

In some aspects, the 3D auto-labeling pipeline 600 models detected keypoints using a structured graph neural network to depict the geometry/spatial relationships of a rigid-body object (e.g., car, bus, truck, etc.). This structured graph model corresponds to the well-structured 3D geometry of a vehicle to facilitate 3D object model building, state estimation, and tracking. This structure graph model may be either predefined or learned in the 3D auto-labeling pipeline 600. As such, this aspect of the present disclosure adds a graphical representation/model to constrain the geometry between the keypoints in a rigid object, such as a directed keypoint graph corresponding to a 3D structured vehicle geometry.

In some aspects, the semantic keypoint predictor 620 implements a 2D keypoint graph neural network (KGNN) that is conditioned according to a structured graph model of a vehicle. In this configuration, the semantic keypoint predictor 620 is configured to link keypoints in a 2D structured object geometry 630 representing an object category of the object 604 in the input ROI 602 (e.g., an image, a frame, a patch, etc.) of a monocular video stream. For example, the 2D structured object geometry 630 is generated by the semantic keypoint predictor 620 using the keypoint heatmap 612. The semantic keypoint predictor 620 may be trained to detect a semantic meaning for the linked keypoints of the 2D structured object geometry 630 to form linked, semantic keypoints in the 2D structured object geometry 630 of the object 604. In this aspect of the present disclosure, semantic keypoints provide a structured vehicle geometry, facilitating a 3D vehicle modeling process.

In this configuration, a 3D lifting block 640 is configured to lift the linked, 2D semantic keypoints of the 2D structured object geometry 630 to a 3D structured object geometry 650. For example, the 3D lifting block 640 uses structure prior information 642 and/or monocular depth information 664 to lift the linked, 2D semantic keypoints of the 2D structured object geometry 630 to a 3D structured object geometry 650. The monocular depths may be determined from the keypoint heatmap 612. According to aspects of the present disclosure, the semantic keypoints includes embed descriptions for associating the first linked, semantic keypoints of the structured object geometry 630 across subsequent frames of the monocular video stream.

According to aspects of the present disclosure, the input ROI 602 corresponds to an image patch (e.g., the object 604 in the input ROI 602) is concurrently provided to a conditional variational encoder (cVAE) 660. In this configuration, the conditional variational encoder 660 infers a 2D NOCS map $\mathcal{M}$ 670 and shape vector z 672, as shown in a cVAE output 670. A geometric/projective alignment block 652 decodes the shape vector z 672 into an SDF and retrieves the 3D surface points p={$p_1, \ldots, p_N$} of a 3D object model 690 in its local frame, and computes the NOCS coordinates $p^c$={$p_i^c, \ldots, p_n^c$}. The geometric/projective alignment block 652 also projects the 3D points l={$l_1, \ldots, l_k$} of the 3D structured object geometry 650 and collects the corresponding NOCS coordinates $l^c$.

In this configuration, the geometric/projective alignment block 652 establishes 3D-3D correspondences between p and l to estimate an initial affine transformation between the points l of the 3D structured object geometry 650 and the points p of the 3D object model 690. To do so, the geometric/projective alignment block 652 finds, for each $p_i$, its nearest neighbor from NOCS distances: $j^* = \mathrm{argmin}_j \|p_i^c - l_j^c\|$ and keeps the result if $\|p_i^c - l_j^c\| < 0.2$. Finally, the geometric/projective alignment block 652 can run a process known in the literature as Procrustes in conjunction with a random sample consensus (RANSAC) algorithm to estimate pose (R,t) and scale s. These operations are represented by 3D RANSAC 692 in FIG. 6.

At this point, a rendering block 680 begins a differentiable optimization over complementary 2D and 3D evidence. While projective 2D information provides strong cues for orientation and shape, 3D points allow reasoning over scale and translation. At each iteration, the rendering block 680 decodes a current shape vector estimate $\hat{z}$ 674, extracts surface points $p_i$ and transforms them with the current estimates for pose and scale: $\hat{p}_i = (\hat{R} \cdot \hat{s}) \cdot p_i + \hat{t}$. This process results in a refined or optimized affine transformation between the points l of the 3D structured object geometry 650 and the points p of the 3D object model 690.

Given the surface-model points in the scene frame, the individual 2D and 3D losses are computed as follows. For the 2D loss, optimization process 440 employs the differentiable SDF renderer of the rendering block 680 to produce a rendering $\mathcal{R}$ (e.g., 3D object model 690) for which maximum alignment with the 2D NOCS map $\mathcal{M}$ 672 is sought. Because the predicted 2D NOCS map $\mathcal{M}$ 672 can be noisy (especially during the first training loop), minimizing dissimilarity ($\min\|\mathcal{M} - \mathcal{R}\|$) can yield unsatisfactory solutions. Instead, the optimization process 440 determines, for each rendered spatial pixel $r_i$ in $\mathcal{M}$, the closest NOCS-space neighbor in $\mathcal{M}$, named $m_j$, and sets them in correspondence if their NOCS distance is below a threshold. To allow gradient flow, the 3D object model 316 uses their spatial indices to resample the image locally. The loss is then the mean distance over all such correspondences $C_{2D}$ in NOCS space:

$$loss_{2D} = \frac{1}{|C_{2D}|} \Sigma(i, j) \in C_{2D} \|\mathcal{R}(r_i) - \mathcal{M}(m_j)\|.$$

For the 3D loss, for each $\hat{p}_i$, the 3D object model 316 determines the nearest neighbor from l and keeps it if it is closer than 0.25 m. Because the vehicle perception module 310 generally produces good initializations, outliers in the optimization can be avoided through the use of a tight threshold. The 3D loss is the mean distance over all correspondences $C_{3D}$:

$$loss_{3D} = \frac{1}{|C_{3D}|}\Sigma(i, j) \in C_{3D}\|\hat{p}_i - l_j\|.$$

Altogether, the final criterion is the sum of both losses, in these configurations: loss=$loss_{2D}$+$loss_{3D}$. In these configurations, the terms are not balanced (e.g., weighted) because both loss terms work with similar magnitudes. Although described with reference to 2D and 3D losses, additional losses include losses from structural and physical constraints. For example, the 3D keypoint lifting module 314 is configured to access a vehicle shape prior information regarding road and physical boundaries. In this example, the vehicle perception module 310 is configured to adjust the linking of the 3D object vehicles over time by applying the road and physical boundaries to the trajectories, which may be optimized based on additional losses from the imposed structural and physical constraints.

Referring again to the auto-label verification process 450 in FIG. 4, the optimization framework may lead to incorrect results at times, resulting in a reduction of the influence of incorrectly-inferred auto-labels. To that end, in these configurations, the 3D keypoint lifting module 314 enforces geometrical and projective verification to remove the worst auto-labels (e.g., cuboids). The 3D keypoint lifting module 314 defines a projective constraint in which auto-labels are rejected if the rendered mask's Intersection Over Union (IoU) with the provided 2D label falls below 70%.

In these configurations, the auto-labels that survive auto-label verification process 450 are harvested and added to the CSS label pool 460. After the first training loop, there is a mixture of synthetic and real samples, in subsequent training loops, that are used to retrain the CSS Network 430. Over multiple self-improving training loops, the CSS network 430 is retrained, leading to better initializations and more accurate 3D auto-labels.

Figure 7:
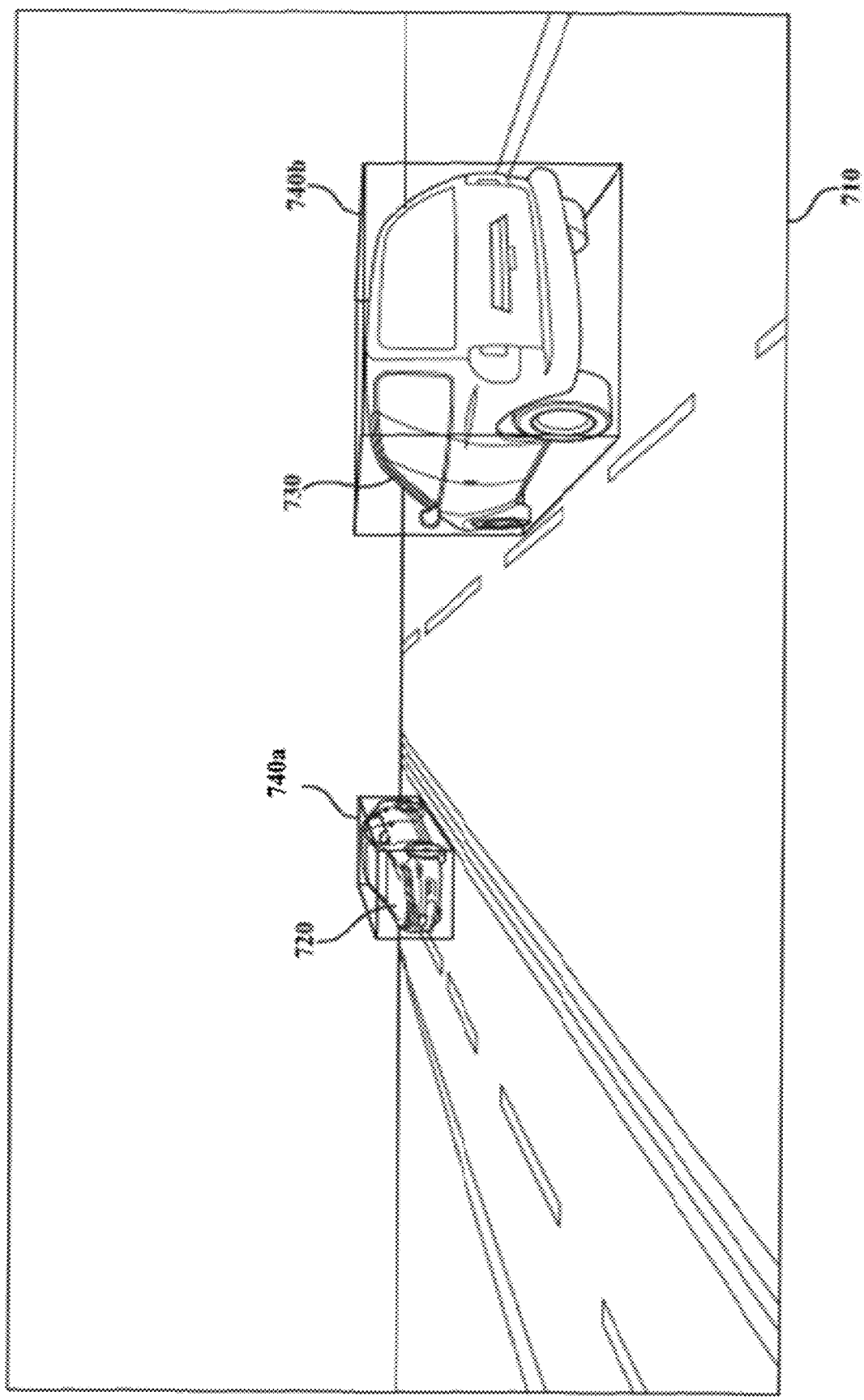
FIG. 7 shows examples of 3D labels output by a 3D auto-labeling pipeline for the 3D auto-labeling system of FIG. 3, in accordance with an illustrative configuration of the present disclosure.

FIG. 7 shows examples of 3D labels output by a 3D auto-labeling pipeline 400 of FIG. 4 for the 3D auto-labeling system 300 of FIG. 3, in accordance with an illustrative configuration of the present disclosure. The scene depicted in input image 710 includes an object 720 (a vehicle) and an object 730 (another vehicle). In this example, the 3D auto-labeling module 318 has extracted 3D label 740a for the object 720 and the 3D label 740b for the object 730. FIG. 7 illustrates that the 3D labels output to a 3D object detector (e.g., the 3D keypoint lifting module 314) are cuboids (e.g., 3D bounding boxes). In this aspect of the present disclosure, geometrically and projectively aligning the 3D object model 690, the 3D structured object geometry 650, and the rendered shape 672 forms a rendered object (e.g., the 3D object model 690). In this configuration, a back projection block 694 generates 3D bounding boxes from the rendered object by back projecting 2D for auto-labeling 3D bounding boxes using the 3D auto-labeling module.

3D Object Detection

Figure 8:
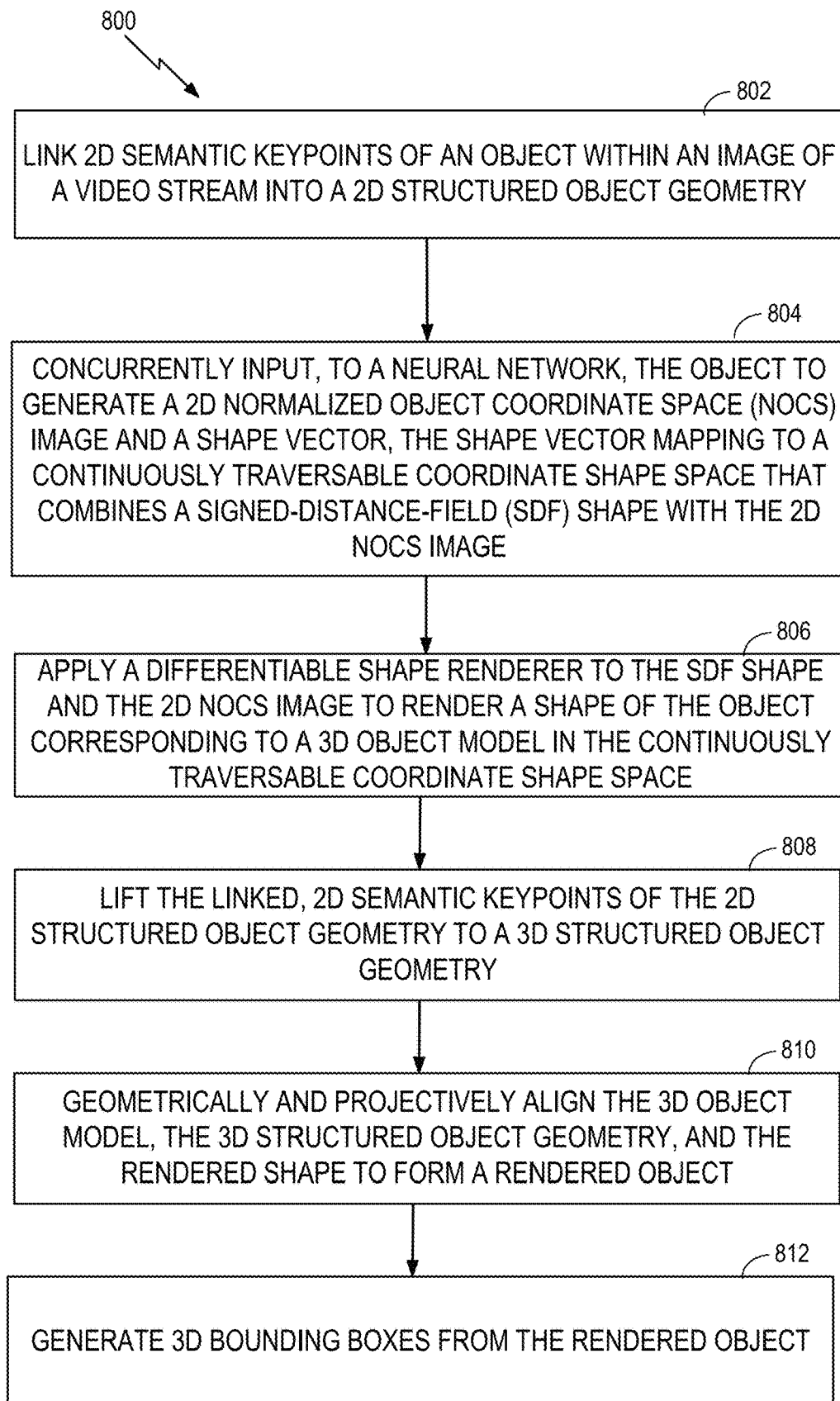
FIG. 8 is a flowchart illustrating a method of 3D auto-labeling using 2D semantic keypoints, according to aspects of the present disclosure.

In these configurations, 3D cuboid auto-labels are not the final goal but rather a means to an end—namely, 3D object detection. As those skilled in the art are aware, once the 3D auto-labeling module 318 has automatically extracted a 3D label (e.g., a cuboid) for an object, it is a relatively simple matter for the vehicle perception module 310 to perform 3D object detection of the object based, at least in part, on the extracted 3D label for the object. In aspects of the present disclosure, the planner module 330 is trained to plan a trajectory of an ego vehicle according to linked trajectories of auto-labeled 3D object vehicles while respecting road and physical boundaries FIG. 8 is a flowchart illustrating a method for 3D auto-labeling of objects using semantic keypoint, according to aspects of the present disclosure. The method 800 begins at block 802, in which 2D semantic keypoints of an object within an image of a video stream are linked into a 2D structured object geometry. For example, as shown in FIG. 6, the semantic keypoint predictor 620 is configured to link keypoints in a 2D structured object geometry 630 representing an object category of the object 604 in the input ROI 602 (e.g., an image, a frame, a patch, etc.) of a monocular video stream. For example, the 2D structured object geometry 630 is generated by the semantic keypoint predictor 620 using the keypoint heatmap 612. The semantic keypoint predictor 620 may be trained to detect a semantic meaning for the linked keypoints of the 2D structured object geometry 630 to form linked, semantic keypoints in the 2D structured object geometry 630 of the object 604 in the input ROI 602.

At block 804, the object is concurrently input to a neural network to generate a 2D normalized object coordinate space (NOCS) image and a shape vector. The shape vector mapping to a continuously traversable coordinate shape space that combines a signed-distance-field (SDF) shape with the 2D NOCS image. For example, as shown in FIG. 6, the input ROI 602 is concurrently provided to a conditional variational encoder (cVAE) 660. In this configuration, the conditional variational encoder 660 infers the 2D NOCS map $\mathcal{M}$ 670 and shape vector z 672, as shown in a cVAE output 670.

At block 806, a differentiable shape renderer is applied to the SDF shape and the 2D NOCS image to render a shape of the object corresponding to a 3D object model in the continuously traversable coordinate shape space. For example, as shown in FIG. 6, the rendering block 680 begins a differentiable optimization over complementary 2D and 3D evidence. While projective 2D information provides strong cues for orientation and shape, 3D points allow reasoning over scale and translation. At each iteration, the rendering block 680 decodes a current shape vector estimate $\hat{z}$ 674, extracts surface points $p_i$ and transforms them with the current estimates.

At block 808, the linked, 2D semantic keypoints of the 2D structured object geometry are lifted to a 3D structured object geometry. For example, as shown in FIG. 6, a 3D lifting block 640 is configured to lift the linked, 2D semantic keypoints of the 2D structured object geometry 630 to a 3D structured object geometry 650. For example, the 3D lifting block 640 uses structure prior information 642 and/or monocular depth information 664 to lift the linked, 2D semantic keypoints of the 2D structured object geometry 630 to a 3D structured object geometry 650. The monocular depths may be determined from the keypoint heatmap 612. According to aspects of the present disclosure, the semantic keypoints includes embed descriptions for associating the first linked, semantic keypoints of the structured object geometry 630 across subsequent frames of the monocular video stream.

At block 810, the 3D object model is geometrically and projectively aligned with the 3D structured object geometry and the rendered shape to form a rendered object. For example, as shown in FIG. 6, the geometric/projective alignment block 652 decodes the shape vector z 674 into an SDF and retrieves the 3D surface points p={$p_1, \ldots, p_N$} of the 3D object model 690 in its local frame, and computes the NOCS coordinates $p^c=\{p_i^c, \ldots, p_n^c\}$. The geometric/projective alignment block 652 also projects the 3D points $l=\{l_1, \ldots, l_k\}$ of the 3D structured object geometry 650 and collects the corresponding NOCS coordinates $l^c$. For the 2D loss, the optimization process 440 of FIG. 4 employs the differentiable SDF renderer of the rendering block 680 to produce the rendering $\mathcal{M}$ (e.g., 3D object model 690) for which maximum alignment with the 2D NOCS map $\mathcal{M}$ 672 is sought.

At block 812, 3D bounding boxes are generated from the rendered object. For example, as shown in FIG. 6, geometrically and projectively aligning the 3D object model 690, the 3D structured object geometry 650, and the rendered shape 672 forms a rendered object (e.g., the 3D object model 690). In this example, the rendering block 680 begins a differentiable optimization over complementary 2D and 3D evidence. At each iteration, the rendering block 680 decodes a current shape vector estimate $\hat{z}$ 674, extracts surface points $p_i$ and transforms the surface. This process results in a refined or optimized affine transformation between the points l of the 3D structured object geometry 650 and the points p of the 3D object model 690. In this configuration, a back projection block 694 generates 3D bounding boxes from the rendered object by back projecting 2D semantic keypoints for auto-labeling 3D bounding boxes using the 3D auto-labeling module 318.

The method 800 includes extracting, using a shared image backbone, interest keypoint within a first image of a video stream based on relevant appearance and geometric features of the first image. The method 800 also includes generated a keypoint heatmap based on the extracted interest keypoints. The method 800 further includes identifying one-or more correspondences between the linked, 3D semantic keypoints and the 3D object model to produce an estimate of an affine transformation between the linked, 3D semantic keypoints and the object model. The method 800 also includes iteratively refining the estimate of the affine transformation via differentiable geometric visual alignment using a differentiable SDF renderer. The method 800 may link the semantic keypoints of block 802 by labeling frames of a monocular video stream using 2D semantic keypoints. The method 800 may generate the 3D bounded boxes of block 812 by performing three-dimensional object detection of auto-labeled 3D vehicle objects within the scene.

In some aspects of the present disclosure, the method 800 may be performed by the SOC 100 (FIG. 1) or the software architecture 200 (FIG. 2) of the ego vehicle 150 (FIG. 1). That is, each of the elements of method 800 may, for example, but without limitation, be performed by the SOC 100, the software architecture 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more PGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for monocular 3D object modeling and auto-labeling with 2D semantic keypoints, comprising:
linking the 2D semantic keypoints of an object within an image of a video stream into a 2D structured object geometry;
concurrently inputting, to a neural network, the object to generate a 2D normalized object coordinate space (NOCS) image and a shape vector, the shape vector being mapped to a continuously traversable coordinate shape space that combines a signed-distance-field (SDF) shape with the 2D NOCS image;
applying a differentiable shape renderer to the SDF shape and the 2D NOCS image to render a shape of the object corresponding to a 3D object model in the continuously traversable coordinate shape space;
lifting the linked, 2D semantic keypoints of the 2D structured object geometry to a 3D structured object geometry;
geometrically and projectively aligning the 3D object model, the 3D structured object geometry, and the rendered shape to form a rendered object; and
back projecting the 2D semantic keypoints for auto-labeling 3D bounding boxes from the rendered object.

2. The method of claim 1, further comprising planning a trajectory of an ego vehicle according to tracking of semantic keypoints of auto-labeled 3D object vehicles.

3. The method of claim 1, further comprising decoding the 2D NOCS image and the shape vector to the 3D object model in the continuously traversable coordinate shape space.

4. The method of claim 1, in which linking the 2D semantic keypoints comprises labeling frames of the video stream using 2D semantic keypoints, in which the video stream comprises a monocular video stream.

5. The method of claim 1, in which linking semantic keypoints comprises:
extracting, using a shared image backbone, interest keypoint within a first image of the video stream based on relevant appearance and geometric features of the first image; and
generating a keypoint heatmap based on the extracted interest keypoints.

6. The method of claim 1, in which geometrically and projectively aligning comprises:
identifying one or more correspondences between the linked, 3D semantic keypoints and the 3D object model to produce an estimate of an affine transformation between the linked, 3D semantic keypoints and the 3D object model; and
iteratively refining the estimate of the affine transformation via differentiable geometric visual alignment using a differentiable SDF renderer.

7. The method of claim 1, in which generating 3D bounding boxes comprises performing three-dimensional object detection of auto-labeled 3D vehicle objects within a scene.

8. The method of claim 1, in which the 3D object model comprises a 3D vehicle object model and the 3D structured object geometry comprises a 3D structured vehicle object geometry.

9. A non-transitory computer-readable medium having program code recorded thereon for monocular 3D object modeling and auto-labeling with 2D semantic keypoints, the program code being executed by a processor and comprising:
program code to link the 2D semantic keypoints of an object within an image of a video stream into a 2D structured object geometry;
program code to concurrently input, to a neural network, the object to generate a 2D normalized object coordinate space (NOCS) image and a shape vector, the shape vector being mapped to a continuously traversable coordinate shape space that combines a signed-distance-field (SDF) shape with the 2D NOCS image;
program code to apply a differentiable shape renderer to the SDF shape and the 2D NOCS image to render a shape of the object corresponding to a 3D object model in the continuously traversable coordinate shape space;
program code to lift the linked, 2D semantic keypoints of the 2D structured object geometry to a 3D structured object geometry;
program code to geometrically and projectively align the 3D object model, the 3D structured object geometry, and the rendered shape to form a rendered object; and
program code to back project the 2D semantic keypoints for auto-labeling 3D bounding boxes from the rendered object.

10. The non-transitory computer-readable medium of claim 9, further comprising program code to plan a trajectory of an ego vehicle according to tracking of semantic keypoints of auto-labeled 3D object vehicles.

11. The non-transitory computer-readable medium of claim 9, further comprising program code to decode the 2D NOCS image and the shape vector to the 3D object model in the continuously traversable coordinate shape space.

12. The non-transitory computer-readable medium of claim 9, in which the program code to link semantic keypoints comprises program code to label frames of the video stream using 2D semantic keypoints, in which the video stream comprises a monocular video stream.

13. The non-transitory computer-readable medium of claim 9, in which the program code to link semantic keypoints comprises:
program code to extract, using a shared image backbone, interest keypoint within a first image of the video stream based on relevant appearance and geometric features of the first image; and
program code to generate a keypoint heatmap based on the extracted interest keypoints.

14. The non-transitory computer-readable medium of claim 9, in which the program code to geometrically and projectively align comprises:
program code to identify one or more correspondences between the linked, 3D semantic keypoints and the 3D object model to produce an estimate of an affine transformation between the linked, 3D semantic keypoints and the 3D object model; and
program code to iteratively refine the estimate of the affine transformation via differentiable geometric visual alignment using a differentiable SDF renderer.

15. The non-transitory computer-readable medium of claim 9, in which the program code to generate 3D bounding boxes comprises program code to perform three-dimensional object detection of auto-labeled 3D vehicle objects within a scene.

16. The non-transitory computer-readable medium of claim 9, in which the 3D object model comprises a 3D vehicle object model and the 3D structured object geometry comprises a 3D structured vehicle object geometry.

17. A system on chip (SoC) for monocular 3D object modeling and auto-labeling with 2D semantic keypoints, the SoC comprising:

a neural processing unit (NPU); and a memory, wherein memory includes:

a semantic keypoint detection module executed by the NPU to link the 2D semantic keypoints of an object within an image of a video stream into a 2D structured object geometry;

a 3D object module trained, using the NPU, to generate a 2D normalized object coordinate space (NOCS) image and a shape vector, the shape vector being mapped to a continuously traversable coordinate shape space that combines a signed-distance-field (SDF) shape with the 2D NOCS image and to apply a differentiable shape renderer to the SDF shape and the 2D NOCS image to render a shape of an object corresponding to the 3D object model in the continuously traversable coordinate shape space;

a 3D keypoint lifting module executed by the NPU to lift the linked, 2D semantic keypoints of the 2D structured object geometry to a 3D structured object geometry; and a 3D auto-labeling module executed by the NPU to geometrically and projectively align the 3D object model, the 3D structured object geometry, and the rendered shape to form a rendered object and to back project the 2D semantic keypoints for auto-labeling 3D bounding boxes from the rendered object.

18. The SoC of claim 17, in which the semantic keypoint detection module is further configured to label frames of the video stream using 2D semantic keypoints, in which the video stream comprises a monocular video stream.

19. The SoC of claim 17, the 3D auto-labeling module, to geometrically and projectively align, is further configured to identify one or more correspondences between the linked, 3D semantic keypoints and the 3D object model to produce an estimate of an affine transformation between the linked, 3D semantic keypoints and the 3D object model, to iteratively refine the estimate of the affine transformation via differentiable geometric visual alignment using a differentiable SDF renderer.

20. The SoC of claim 17, in which the 3D object model comprises a 3D vehicle object model and the 3D structured object geometry comprises a 3D structured vehicle object geometry.

* * * * *